(12) United States Patent
Fujii

(10) Patent No.: US 6,347,986 B1
(45) Date of Patent: Feb. 19, 2002

(54) METHOD FOR PROCESSING FISH HEADS AND APPARATUS FOR SEPARATING PROCESSED FISH HEADS

(75) Inventor: Keisuke Fujii, Nemuro (JP)

(73) Assignee: Fujii Suisan Co., Ltd., Hokkaido (JP)

( * ) Notice: Subject to any disclaimer, the term of this patent is extended or adjusted under 35 U.S.C. 154(b) by 0 days.

(21) Appl. No.: 09/622,420

(22) PCT Filed: Jul. 23, 1999

(86) PCT No.: PCT/JP99/03973

§ 371 Date: Aug. 16, 2000

§ 102(e) Date: Aug. 16, 2000

(87) PCT Pub. No.: WO00/35959

PCT Pub. Date: Jun. 22, 2000

(30) Foreign Application Priority Data

Dec. 17, 1998 (JP) ............................................. 10-358790
Dec. 21, 1998 (JP) ......................................... 10-10124 U

(51) Int. Cl.[7] .............................................. A22C 25/16
(52) U.S. Cl. ....................................................... 452/135
(58) Field of Search .................................. 452/135, 138, 452/139

(56) References Cited

U.S. PATENT DOCUMENTS

| | | | |
|---|---|---|---|
| 2,450,398 A | * 9/1948 | Sanders | 452/135 |
| 3,471,299 A | * 10/1969 | Duckworth et al. | 452/138 |
| 5,427,568 A | * 6/1995 | Mueller | 452/135 |

FOREIGN PATENT DOCUMENTS

| | | | | |
|---|---|---|---|---|
| JP | 51-128496 | 11/1976 | | |
| JP | 55-74796 | 6/1980 | | |
| JP | 6-339337 | 12/1994 | | |
| SU | 13533394 A | * 11/1987 | | 452/139 |
| SU | 1697678 A | * 12/1991 | | 452/135 |

* cited by examiner

Primary Examiner—Peter M. Poon
Assistant Examiner—Kevin Jakel
(74) Attorney, Agent, or Firm—Lowe Hauptman Gilman & Berner, LLP

(57) ABSTRACT

A fish head, after being heated and softened, is broken down into its nose cartilage and various residues by being rotated and crushed, after a fish head. The method of processing a fish head also includes the following steps: separating the nose cartilage into an end proboscis part and a rear part; making a paste by removing fats after making comminutions of the cartilage; making a paste by removing the fats after making comminutions of the end proboscis part; making a paste of the aforesaid rear part; making a raw material from which to extract chondroitin sulfate, after removing the fats of the nose cartilage; making a powder from the paste of the end proboscis part; and making a powder from the paste of the rear part. Through the above methods it is possible to break down a fish head into its various parts easily and accurately; in particular, to separate the nose cartilage from the rest of the fish head, to break down the nose cartilage into the end proboscis part and the rear part, and to make the above parts, including the residues, into products having forms that are easy to handle and utilize.

11 Claims, 6 Drawing Sheets

METHOD FOR PROCESSING FISH HEADS AND APPARATUS FOR SEPARATING PROCESSED FISH HEADS

BACKGROUND OF THE INVENTION

1. Field of the Invention

This invention is intended to serve as an apparatus that utilizes a method of processing fish heads and separating them into their various parts, thus making possible the effective use of fish heads, which generally are treated as fish-processing waste.

2. Description of the Prior Art

In recent years, the aquaculture of fish, especially salmonids, has been increasing greatly, and it is said that more than 200,000tons of chum salmon are produced in Japan each year. However, the consumption of so-called salted salmon with the head intact is decreasing in Japan, as the eating habits in this country change. In contrast, the production of flaked food, dried dainty salmon without the head, and thickly sliced fish fillet is increasing remarkably. In producing these foods, the fish head is cut off by a machine and almost all of the heads are disposed of as fish-processing waste. The disposal of such waste is becoming a social problem, and it is anticipated that the volume of such so-called waste will increase in the future.

However, the cartilage that is in the head of fish in the Chondrichthyes class, such as sharks, is well-known for being sold as a health food after it is processed into a fine powder. But it is becoming difficult to acquire the cartilage of sharks, because this shark resource itself is rare, in addition to being extremely expensive. Also, special international regulations and other factors pose additional problems. Therefore, at present, there is much interest in effectively using the nose cartilage of fish of the Osteichthyes class, such as salmonids, as a substitute for shark cartilage, which is expensive and difficult to obtain.

However, the head of a salmonid is very unsanitary, with blood around the gills, secretions in the epidermis, and so on. Moreover, it is easy for a worker to have an accident while using a knife, such as a kitchen knife, to remove the nose cartilage from the head. In particular, because the epidermis is slippery, workers can easily lose their grip on the fish head and cut their hands. Thus, this work is time consuming and requires that workers pay close attention to what they are doing. As a result, productivity is low and very costly. As a result, vigorous efforts are not being made to use the above-mentioned salmonid head effectively, and there has been little study concerning the possible nutritional value or other beneficial uses of the constituents of the nose cartilage of such a fish. Thus, the possible applications for using such nose cartilage in or with various kinds of foods are not being realized.

Nose cartilage accounts for approximately 10.0% of the weight of the head of a fish such as a salmon. Moreover, proteoglycan, which is a conjugated protein, exists in nose cartilage. Chondroitin sulfate is an acid mucopolysaccharide that removes a particular protein from proteoglycan. Related to this, a recent study showed the following: Chondroitin sulfate accounts for approximately 3.0% of the weight of the nose cartilage and for approximately 0.3% of the weight of the entire head. In laboratory experiments, chondroitin sulfate has been extracted from the head of salmonids, particularly from the nose cartilage, and various studies relating to the medical effects of such chondroitin sulfate have begun. However, if the cost of producing nose cartilage, which is the necessary raw material from which chondroitin sulfate is extracted, is considered, the cost of producing chondroitin sulfate is very high. Productivity is low because there is not available a system that improves the cost performance relating to the use of fish heads. As a result, the manufacture of chondroitin sulfate from the heads of salmon is limited to the small-scale level of refinement that is possible in a laboratory.

Chondroitin sulfate accounts for approximately 0.3% of the weight of the entire salmon head. However, although the head itself is waste and the purchasing cost pr sales value thereof is zero, the cost of extracting chondroitin sulfate for business purposes is very high. If all of the direct and indirect costs—such as the transportation cost sand deep-freezing storage fees for the head; personnel expenses; lighting and heating costs; machine and equipment expenses; and so on—involved in extracting chondroitin sulfate, which constitutes only 0.3% of the weight of the head, are totaled, to extract such chondroitin sulfate is too expensive to be conducted as a business. The high costs are a big fetter that in effect prohibit the production of chondroitin sulfate.

Because the cost of producing only chondroitin sulfate is too high, it is not feasible as a business activity. The solution to this problem, therefore, is to develop a processing method that offers high cost performance by using, in addition to the nose cartilage, the other parts of the fish head; i.e., the residues that account for 90% of the weight of the head. In addition, an improvement (i.e., increase) in the percentage of chondroitin sulfate (which has a high value) that is extracted from the raw materials, also is necessary.

The objective of the subject invention is to solve the above-mentioned problems by serving as an apparatus that easily and accurately: (1) processes fish heads so as to separate them into their various parts, and especially to separate the nose cartilage from the rest of the fish head, (2) separates the end proboscis part and the other rear parts from the nose cartilage, (3) processes the above various parts of the fish head, including the residues, into forms that can be used in manufacturing products of commercial value.

SUMMARY OF THE INVENTION

The subject invention's method of processing a fish head has the following characteristic step: to break apart a fish head and to separate the nose cartilage from various residues by rotating the fish head and giving an impulsive force to it after it has been heated and softened.

In more detail, a fish head is heated and softened and then the hot fish head is put into a rotary drum of which the surface is a round net-like body. A plurality of plate blades are affixed either to the inside of the rotary drum or to the shaft of the drum, opposing each other in the direction of the drum's circumference and axial plane, respectively. By rotation of the rotary drum, the fish head is rotated and crushed against the plate blades and then the fish head is separated into the nose cartilage and various residues.

In the second step of the process of separating the aforesaid nose cartilage into the end proboscis part and the rear part, the nose cartilage is put into the aforesaid rotary drum of which the surface is a round net-like body. A plurality of plate blades are affixed either to the inside of the rotary drum or to the shaft of the drum, opposing each other in the direction of the drum's circumference and axial plane, respectively.

Moreover, the method of this invention comprises the following steps: making paste by removing fats after making comminutions of the above-mentioned nose cartilage that has been separated by the aforesaid process, making a meal by grinding the aforesaid residues; making a paste by removing fats after making comminutions of the aforesaid end proboscis part; making a paste of the aforesaid rear part; making a raw material from which to extract chondroitin sulfate after removing the fats of aforesaid nose cartilage; making a powder from the paste of the aforesaid end proboscis part; and making a powder from the paste of the aforesaid rear part.

This invention's apparatus for separating the processed parts of a fish head of that is used in the aforesaid methods of processing comprises: a shaft that rotates by being driven by a rotating means; a plurality of support members that are separately joined to the shaft in the axial direction of the shaft; a rotary drum made of a net-like body that is rounded at the aforesaid support members, that forms a processing space into which is put hot said fish head (in particular, the net-like body of the rotary drum being formed by a plurality of reticles that are of various sizes according to the desired type of processing of the aforesaid fish head), and that is freely movable from said support members and is exchangeable; and a plurality of plate blades that are installed in the rotary drum and that project into the aforesaid processing space.

BRIEF DESCRIPTION OF THE DRAWINGS

FIG. 3 is a two-part schematic illustration showing the structure of the heating unit of the apparatus that is explained for the best embodiment of the invention.

DETAILED DESCRIPTION OF THE INVENTION

Best Embodiment of the Invention

Figure 1:
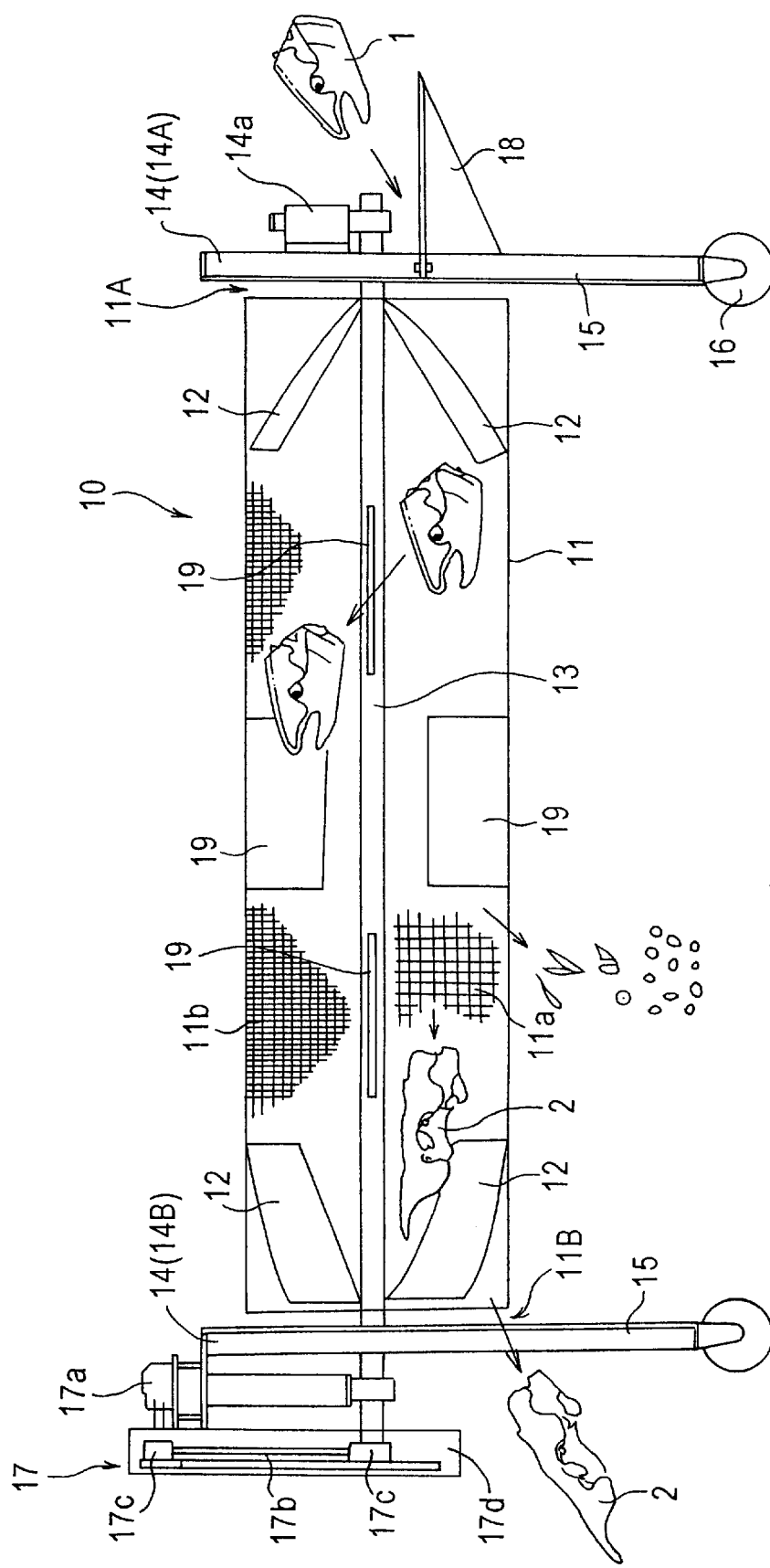
FIG. 1 is a schematic illustration showing the structure of the separation unit of the apparatus that is explained for the best embodiment of the invention.
Figure 2A:
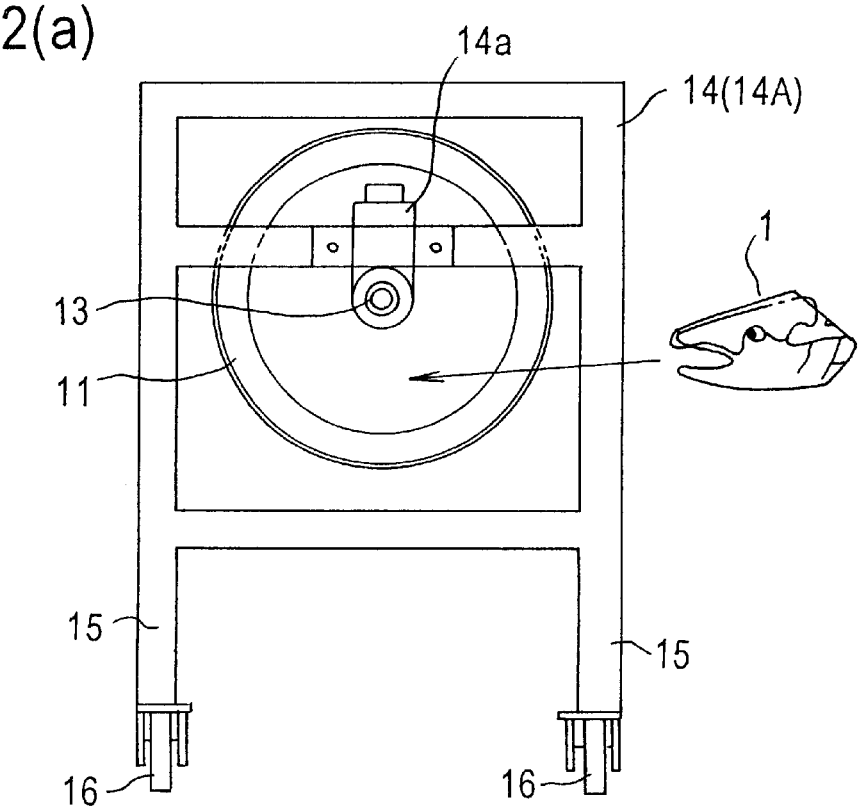
FIG. 2 shows two side-plane views of FIG. 1, with FIG. 2(a) showing a front view of the right end of FIG. 1, and FIG. 2(b) showing a front view of the left end of FIG. 1.
Figure 2B:
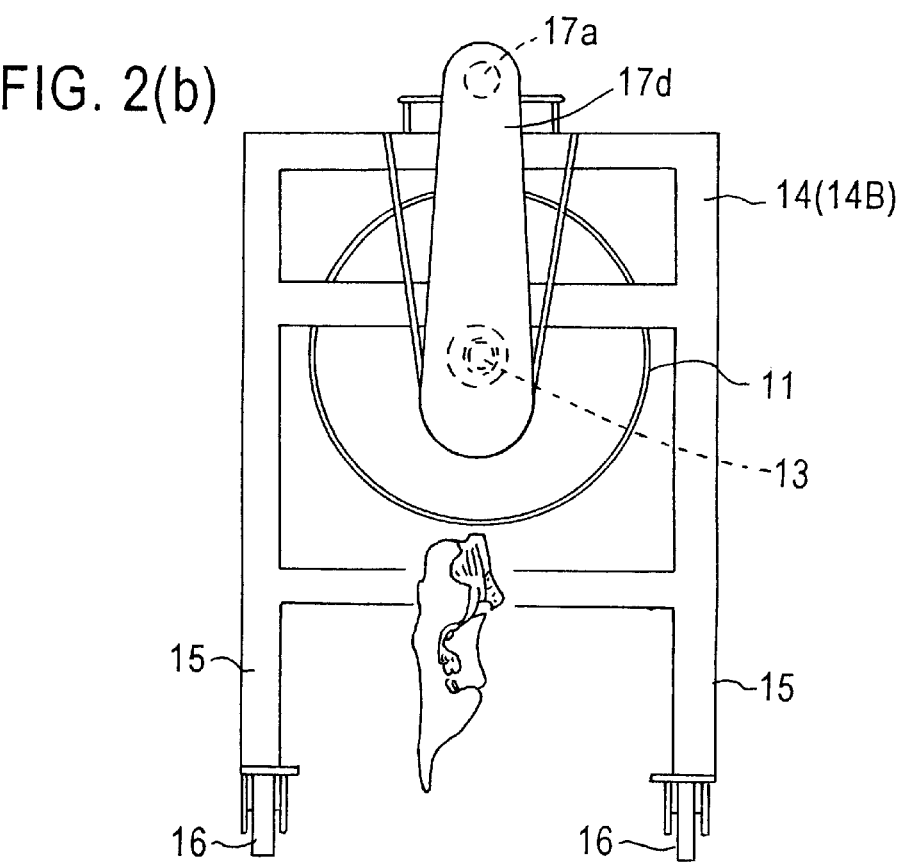
Figure 3A:
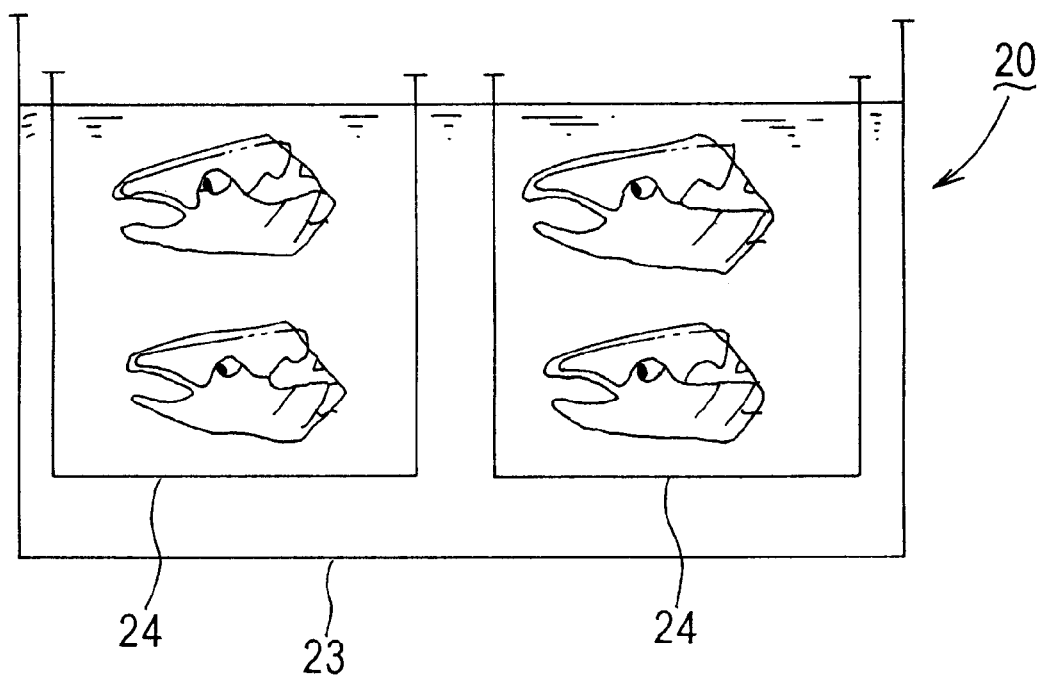
FIG. 3(a) is a cross-section view and FIG. 3(b) is a greatly enlarged cross-sectional view of the metal vessel.
Figure 3B:
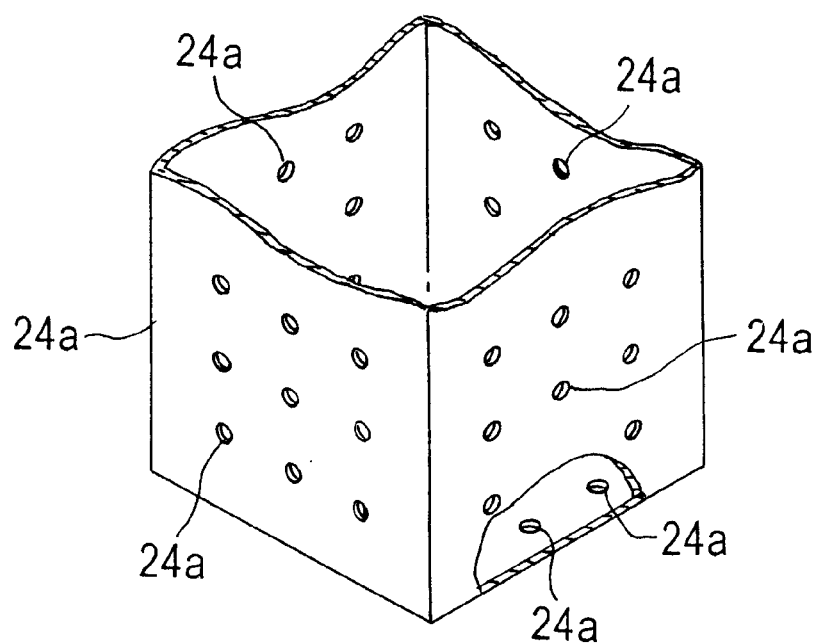

This apparatus mainly comprises the separation unit 10, which is shown in FIG. 1 and FIG. 2, and the heating unit 20, which is shown in FIG. 3.

In the separation unit 10 there is a rotary drum 11 that has a circular cylindrical shape. The surface of this rotary drum 11 is a round net-like body, like a wire netting or a punchboard, that is open at both ends 11A and 11B. As shown in FIG. 1, which depicts an example of an embodiment of this invention, the shapes of the reticular openings of this net-like body range from large rectangular ones 11a and small rectangular ones 11b. However, it is possible for the reticular openings to be, in addition to the rectangular shapes 11a and 11b, of various other shapes, such as a polygonal shape like a rhomboid, or a half-circle, circle, or oval, among others. It also is possible for a plurality of the above-described shapes to be combined.

A shaft 13 is placed inside and affixed to this rotary drum 11 through the support members 12 at the axial center of this rotary drum 11. Both ends of this shaft 13 are supported by two support brackets 14A and 14B through bearings 14a and 14b, respectively, in this working example. In particular, the rotary drum 11 and the shaft 13 are supported together by the support bracket 14; therefore, this axial line is in the horizontal direction and is located at a fixed distance from the bottom of the drum, and the rotary drum 11 and the shaft 13 are freely rotatable as a unit.

The two support brackets 14A and 14B have four legs 15 that are mounted two on both sides, and a wheel 16 is installed at the bottom tip of each of these four legs 15; because these wheels 16 can roll, the entire separation unit 10 is freely movable. As shown in FIG. 2(a) (which shows a front view of the right end of FIG. 1), a bearing 14a is installed in bracket 14A, which is placed at the entrance end of the drum, and the shaft 13 is supported by the bearing 14a.

In addition, as shown in FIG. 1 and FIG. 2(b) (which shows a front view of the left end of FIG. 1), a bracket 14B is attached to the driving mechanism 17 at the exit end of the drum. In this driving mechanism 17, a drive motor 17a is connected to the shaft 13 through the chain belt 17b and the sprockets 17c, and the chain belt 17b is covered by the chain cover 17d. Therefore, when the drive motor 17a is in operation, this rotating power is transmitted to the shaft 13 through the chain belt 17b and the sprockets 17c, and the rotary drum 11, which is united with this shaft 13, rotates around the axis center. The table 18, which extends out from side to side in a horizontal direction, is affixed to the shaft 13 by the entrance-side bracket 14A.

Moreover, a plurality of plate blades 19 are affixed either to the inside of the rotary drum 11 or to the shaft 13. The plate blades 19 that are affixed to the inner surface of the rotary drum 11 extend from the inside of the drum 11 in the direction of the shaft 13. In contrast, the plate blades 19 that are affixed to shaft 13 extend from the shaft 13 in the direction of the inner surface of the rotary drum 11. All of the plate blades 19 are affixed either to the rotary drum 11 or to the shaft 13, opposing each other in the direction of the drum's circumference and axial plane, respectively.

As an example of the embodiment, the heating unit 20 is illustrated in FIG. 3. The heating unit 20 has within it a housing 23, which is a rectangular box whose upper side is open. Inside the housing 23 are a plurality of metal vessels 24, each of which has a plurality of holes 24a on its base plane and its four side planes.

When the above-described housing 23 is filled with boiling water, the boiling water enters into the vessel 24 through the holes 24a. Therefore, when fish heads are put into the vessel 24, they are heated by the boiling water in the vessel 24. In this implementation example, hot water is used as the means for heating the fish heads, but the heating can also be realized by using an iron steam pot, as just one other example of other possible means.

Next, an embodiment of the operating process, using the separation apparatus comprised as described above, will now be described in detail.

Figure 4:
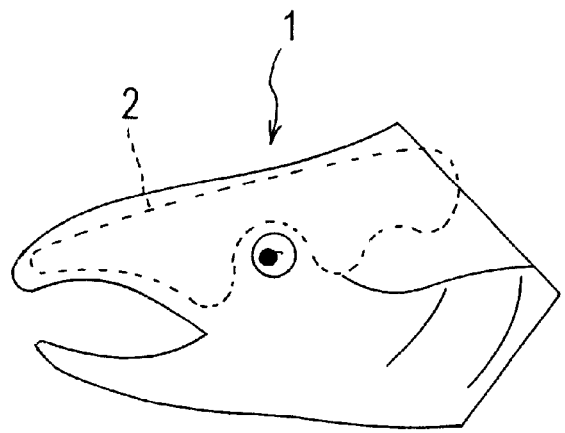
FIG. 4 is a drawing of a fish head.
Figure 5A:
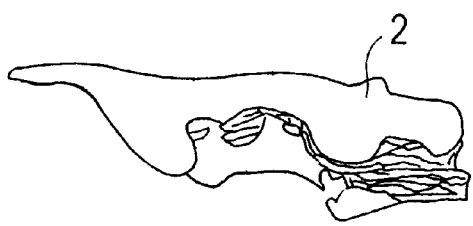
FIG. 5 is a three-part drawing of the nose cartilage of a fish head, with FIG. 5(a) showing a side view, FIG. 5(b) showing a view of the top surface, and FIG. (c) showing a view of the base surface.
Figure 5B:
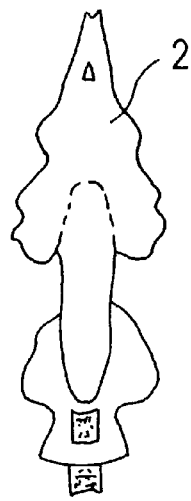
Figure 5C:
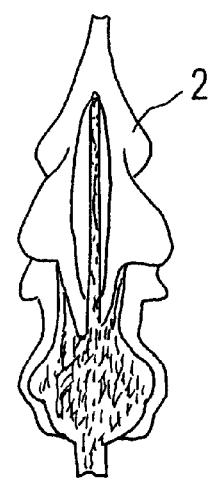

A fish head 1 (FIG. 4), which was cut off in a fish-processing factory or other facility and then collected for shipment as cargo, is put into the vessel 24 of the heating unit 20. The fish head 1 that has been put into the vessel 24 is heated with boiling water, and thermal deformation occurs in the epidermis, fat, muscles, and so on of the fish head 1, and then lysis or solidification occurs, as a result of which it becomes easy for the entire head, which includes cartilage, hard bones, and gills, to collapse.

Next, the fish head 1, which has been heated in the heating unit 20, is put into the opening of the entrance 11A of the rotary drum 11. Then, as a result of the operation of the drive motor 17a, the rotary drum 11 rotates, the fish head 1 in the rotary drum 11 is rotated by the rotation of this drum 11 and is moved forward and then crushed by being stirred by the plate blades 19. Because the fish head 1 has been heated and softened, it is easy for the head to collapse while being moved from the entrance of the rotary drum 11 to the exit thereof. The fish head 1 is separated into residues such as the nose cartilage 2, the hard bones, the gills, the epidermis, and the muscles, which are collected from the opening 11B of the exit side of the rotary drum 11.

The round surface of the rotary drum 11 is a reticular-like figure, and the residues such as the hard bones, the gills, the skin, the muscle, and so on become minute in size and fall through the reticular spaces to the outside of the rotary drum 11. Therefore, only the nose cartilages 2 remain in the rotary drum 11, and they are carried to and passed through the opening at the exit side and collected there. If the reticular openings of the net-like body are sized and shaped appropriately, as rectangles, polygons, half-circles, circles, or ovals, and so on, and are combined as mentioned above, each type of minute residue, such as the hard bones, the gills, the epidermis and the muscles, will fall through its respective reticular openings, and all of the residue will be collected together underneath the net-like body, and the nose cartilage 2 can easily be removed.

Concerning the separating apparatus of this invention, no liquid, such as water, is used in the separation process. Therefore, in the rotary drum 11, the fish head 1 is subjected to a directive and strong crushing force and is easily collapsed and separated into its component parts. Because the fish head 1 is carried from the entrance side to the exit side of the rotary drum 11 within about 3 minutes, the nose cartilages 2 are able to be continuously gathered in large quantities in a short time. Also, because processing the fish head with this invention doesn't involve the use of water, no unsanitary sewage is generated. Moreover, the processing is easy because there is no moisture in the residues, such as the hard bones, gills, epidermis, or muscle, that fall through the reticular openings.

Because this apparatus is small and freely movable, it call be easily used in fish-processing factories anywhere.

Although the following was not illustrated in FIG. 1 through FIG. 3, by installing a belt conveyer and a receiving board, and so on under the rotary drum 11, a receiving board can be used to prevent scattering of the falling residues. The residues are then transported by a belt conveyer for subsequent processing.

Next, an embodiment of the defatting process will now be described in detail.

The nose cartilage that was separated and removed by the aforesaid process is made into comminutions above a mixer, and the fat nodules are exposed on the surface of the comminutions. In this process, a similar effect can be obtained by using, as an alternative, a cutting apparatus (having an edge), such as a slicer, that can cut thinly.

Either the comminutions or the sliced pieces of the nose cartilage mentioned above are put into a cleaning tank (not shown in a figure), and those items are defatted through a process of well washing with cold or hot water.

Because thermal denaturation and oxidization can easily occur, either the comminutions or the sliced pieces of the nose cartilage that have been defatted by the above-mentioned method are rapidly frozen in a deep freezer immediately after they have been dehydrated.

The frozen nose-cartilage comminutions that have been made by the above-mentioned process are removed from the deep freezer and then immediately put into a kneading machine, such as a chopper or a silent cutter, so as to make a paste of the nose cartilage. By these procedures, a high-quality paste that is neither denatured nor oxidized can be made.

The residues, such as hard bones, gills, epidermis, muscle and so on, that are separated in the above-mentioned process, comprise 90% of the fish head in terms of weight. The residues are easy to treat in a further process, because 100 g of the residues include 67.1 g of moisture. In addition to the above, 100 g of the residues comprises 16.6 g of protein, 1,500 mg of calcium, 10.8 g (including 1,160 mg of DHA and 1,240 mg of EPA) of lipids, and other minor components, such as hydroxyproline, taurine, minerals, amino acids, and so on, in a good balance. As is described above, the residues contain many useful ingredients and rich nutrients.

The above-mentioned residues are transported by a belt conveyer that is placed under the separation apparatus 10, and they are then ground by a chopper or a silent cutter so as to make a meal, and then the meal of the residues is rapidly frozen in a deep freezer.

It is possible to make food, of which the commodity value is high, for the aquaculture of fish and/or feed for domestic animals, by adding the liver of the fish to the aforesaid meal, thereby increasing the amount of vitamin A, and by adding albino, thereby supplementing nucleic acids and restraining the generation of active oxygen.

An embodiment of the process of making a raw material from which can be extracted chondroitin sulfate, of which the commodity value is high, will now be described in detail.

Figure 6A:
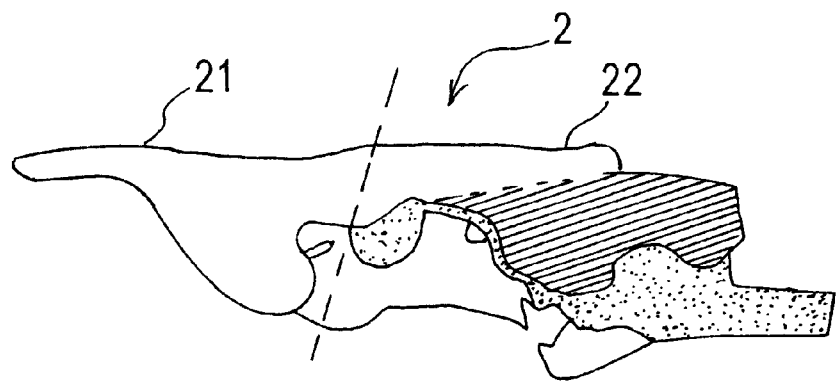
FIG. 6 is a three-part drawing of the nose cartilage of a fish head, with FIG. 6(a) being a side showing a line that separates the end proboscis part from the rear part of the nose cartilage, FIG. 6(b) being a drawing of an end proboscis part after separation of the nose cartilage, and FIG. 6(c) being a drawing of the rear part of the cartilage after separation of the nose cartilage.
Figure 6B:
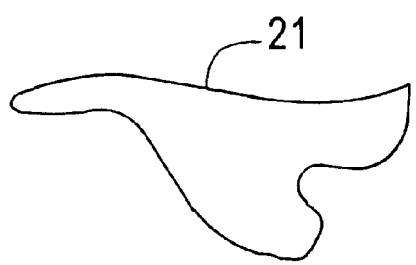
Figure 6C:
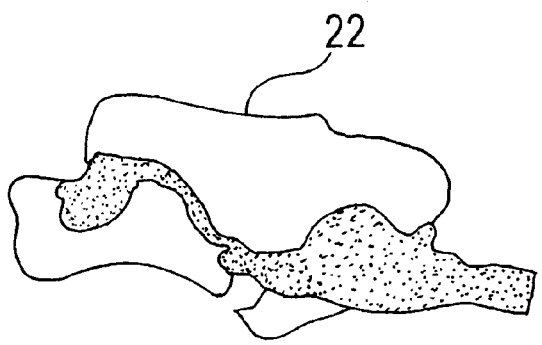

As FIG. 6 illustrates, the nose cartilage comprises the end proboscis part 21, which is composed only of cartilage, and the rear part 22, which is composed of cartilage and hard bones, with the two parts being firmly combined with each other. However, the nose cartilage can easily be broken along the dotted line indicated in FIG. 6(a) when suitable force is applied along the oblique line indicated in that figure. In that way, by applying an impulsive force and vibration, the nose cartilage is separated into the end proboscis part 21, which is composed only of cartilage, and the rear part 22, which is comprised of cartilage and hard bones.

Figure 7:
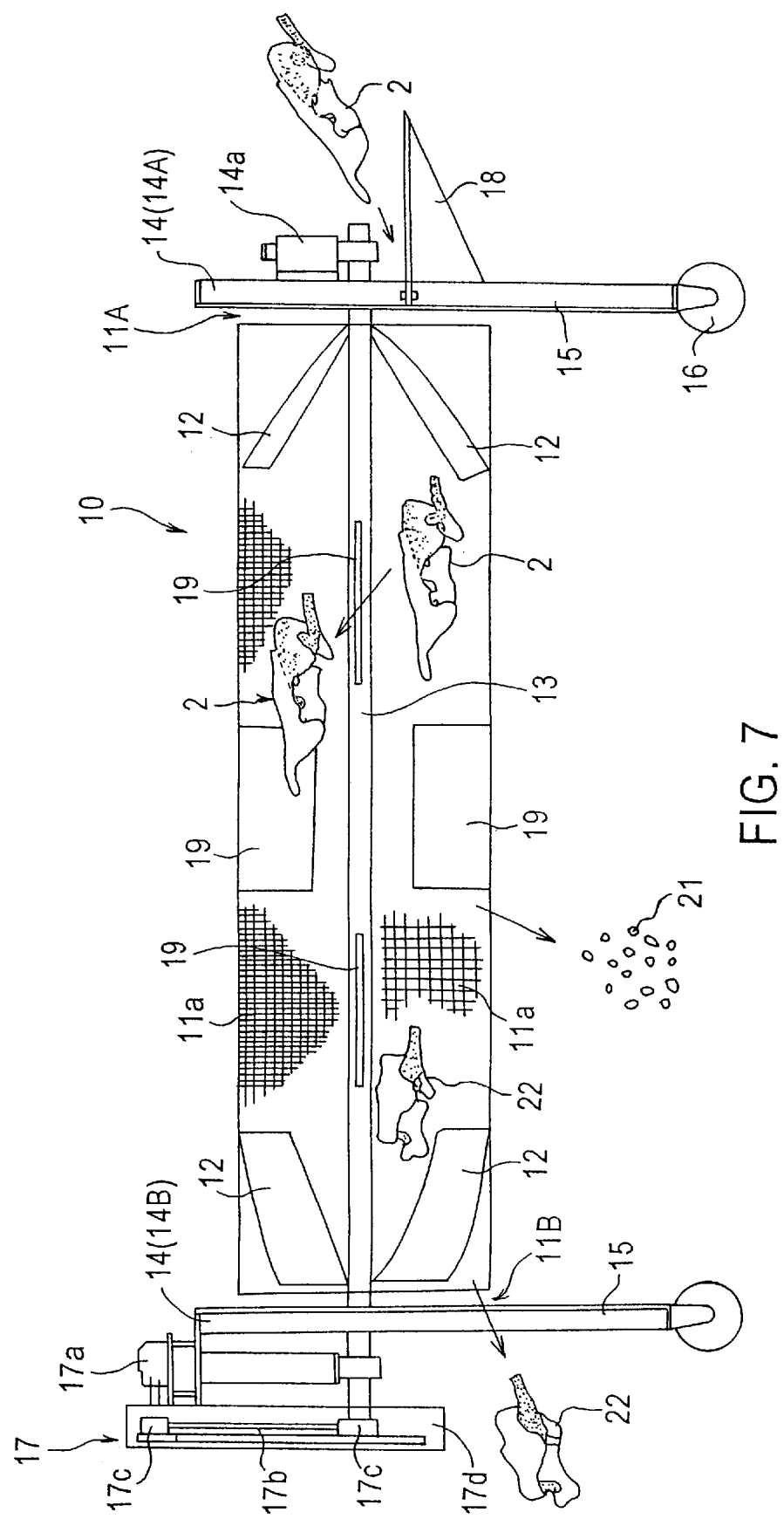
FIG. 7 is a schematic illustration showing the structure of the separation unit of the apparatus in the process of separating a nose cartilage into an end proboscis part and a rear part.

FIG. 7 shows the separating apparatus that separates the nose cartilage 2, which was previously separated from the fish head in the primary process, into the end proboscis part 21 and the rear part 22.

A description of the structure of this apparatus is omitted here because the structure of this apparatus is almost identical to the one shown in FIGS. 1 and 2 and previously described.

As shown in FIG. 7, the nose cartilage 2 is put into the opening at entrance 11A of the rotary drum 11. Then, as a result of the operation of the drive motor 17a, the rotary drum 11 rotates, the nose cartilage 2 in the rotary drum 11 is rotated by the rotation of this drum 11 and is moved forward and crushed by being stirred by the plate blades 19. While the nose cartilage 2 is being carried from the entrance of the rotary drum 11 to the exit thereof, (1) the nose cartilage is separated into the end proboscis part 21 and the rear part 22, (2) the end proboscis part 21, which is comprised only of soft cartilage, is broken into minute tips that fall through the reticular openings of the net-like body, and (3) the rear part 22, which includes hard bones, passes out of the rotary drum 11 through the opening 11B on the exit end of the rotary drum 11, after which it is collected.

Chondroitin sulfate, which comprises 2.9%–3.0% of the weight of the entire nose cartilage, comprises 4% of the weight of the end proboscis part that is collected by the aforesaid process. Thus, the the chondroitin sulfate content of the end proboscis part is 25% or more higher in concentration than that of the nose cartilage taken as a whole. The paste that is made from this end proboscis part has high commodity value as raw material from which chondroitin sulfate can be extracted.

Moreover, the aforesaid the end proboscis part 21 is made into comminutions in such a way that their fat nodules are exposed on their surfaces. The comminutions are then put into a cleaning tank and defatted by washing them with cold or hot water. In this process, the fat contents of the end proboscis decreases from 10.0% to 0.3% in terms of weight. The end-proboscis particles that have been defatted by the above-described method are rapidly frozen in a deep freezer and are made into a paste by a kneading machine.

In contrast, the entire rear part is made into a paste, because the cartilage in the rear part is firmly combined with the hard bones, and it is difficult to separate them from each other. The paste of the rear part is useful as a highly functional food material of which the contents of calcium, DHA, and EPA are higher than in the end proboscis, while the chondroitin sulfate content is lower in the rear part than in the end proboscis. This rear-part paste also is frozen.

Through the process of freeze drying, powders can be obtained from both of the frozen pastes—that from the end proboscis and that from the rear part—that have been made by the method described above. These two powders can be used as additives in pharmaceuticals, cosmetics, health foods, and so on, without further processing.

Effects of the Invention

By this invention it is possible to separate a fish head into its various parts; in particular, to break down a fish head into its nose cartilage and various residues, and then to separate the nose cartilage into its end proboscis and rear parts. It also is possible to make a paste or powder of each of the various parts, including the residues, that have been separated from the fish head. The paste and powder can be offered for use in other manufacturing products.

In addition, the apparatus can easily be installed in fish processing factories anywhere, because the apparatus for this method of processing a fish head is simple, small and, and inexpensive. In addition, the generation of fish-processing waste can be limited.

Moreover, it is possible to provide a raw material from which to extract chondroitin sulfate at a low cost that makes feasible its use for medical purposes.

EXPLANATION OF NUMBERS IN FIGURES 1 fish head
2 nose cartilage
10 separation unit
11 rotary drum
11a, 11b rectangular reticular openings
12 support member
13 shaft
14 support bracket
14a, 14b bearings
15 legs (4)
16 wheels (4)
17 drive mechanism
17a drive motor
17b chain belt
17c sprockets
17d chain cover
18 table
19 plate blades
20 heating unit
21 end proboscis part of nose cartilage
22 rear part of nose cartilage
23 housing
24 metal vessel
24a holes

What is claimed is:

1. An apparatus for separating fish each having first and second parts, comprising:

a rotary drum formed as a net-like body and defining therein a processing space for receiving said fish;

a rotatable shaft extending in said processing space, along an axial direction of said drum, and driven by a rotating mechanism;

and a plurality of plate blades each installed in said processing space and extending from one of said drum and said shaft toward the other of said drum and said shaft, for facilitating separation of said first and second parts of said fish when said shaft is rotated by said rotating mechanism.

2. The apparatus of claim 1, further comprising a plurality of support members for fixing said drum and said shaft together.

3. The apparatus of claim 1, wherein said net-like body of said rotary drum includes a plurality of reticular openings shaped and sized to allow said first parts of said fish to pass through while retaining said second parts of said fish in said processing space.

4. The apparatus of claim 1, wherein said drum and said shaft are configured to be freely rotatable as a unit.

5. The apparatus of claim 1, wherein said drum and said shaft are disposed substantially horizontally.

6. A method of processing a fish head, and comprising the steps of:

separating the nose cartilage and residues other than the nose cartilage from said fish head, making paste by removing fats after making a comminution of said nose cartilage, and pulverizing said residues.

7. A method, as claimed in claim 6, for separating the end proboscis part and the rear part from said nose cartilage, making said paste by removing fats after making said comminution of said end proboscis part, and making said paste of said rear part.

8. A method as claimed in claim 7, of making a raw material from which to extract chondroitin sulfate after removing fats from said nose cartilage.

9. A method as claimed in claim 7, of pulverizing said paste after making said paste from said nose cartilage or said end proboscis part.

10. A method as claimed in claimed or claim 6, of making a raw material from which to extract chondroitin sulfate after removing fats from said nose cartilage.

11. A method as claimed in claim 6, of pulverizing said paste after making said paste from said nose cartilage or an end proboscis part.

* * * * *